United States Patent [19]

Godet

[11] 4,013,960
[45] Mar. 22, 1977

[54] QUADRAPHASE MODULATOR

[75] Inventor: Sidney Godet, Little Falls, N.J.

[73] Assignee: International Telephone and Telegraph Corporation, Nutley, N.J.

[22] Filed: Feb. 6, 1976

[21] Appl. No.: 655,806

[52] U.S. Cl. .................................. 325/139; 325/47; 325/60; 325/126; 332/9 R; 332/21

[51] Int. Cl.² ............................................ H03C 3/00

[58] Field of Search ............... 332/9 R, 9 T, 10, 21, 332/22, 29; 325/126, 139, 47, 60

[56] References Cited

UNITED STATES PATENTS

| | | | |
|---|---|---|---|
| 3,391,339 | 7/1968 | Lynch | 325/60 |
| 3,686,588 | 8/1972 | Jackson et al. | 332/9 |
| 3,710,257 | 1/1973 | Low et al. | 325/60 |
| 3,961,286 | 6/1976 | Kim | 332/22 |

*Primary Examiner*—John Kominski
*Attorney, Agent, or Firm*—John T. O'Halloran; Alfred C. Hill

[57] ABSTRACT

A first hybrid circuit receives a RF carrier signal and provides two equal amplitude in phase RF carrier signals each phase modulated in a different phase modulator by a different digital baseband signal. The two resultant modulated signals provide input signals to a four-port hybrid circuit. This hybrid circuit produces a difference signal and a sum signal from the two input signals. The difference signal is phase shifted a predetermined amount in a fixed phase shift device. The phase shifted difference signal and the sum signal are combined in a second hybrid circuit to provide a quadraphase output signal which is coupled to a transmitting antenna through a hard limiting amplifier.

29 Claims, 4 Drawing Figures

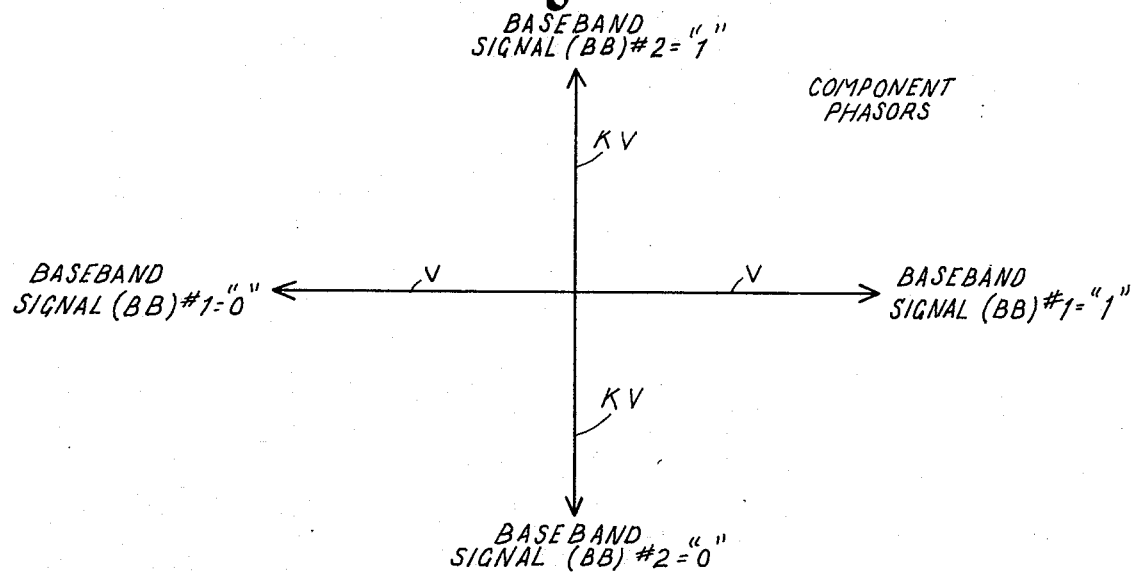
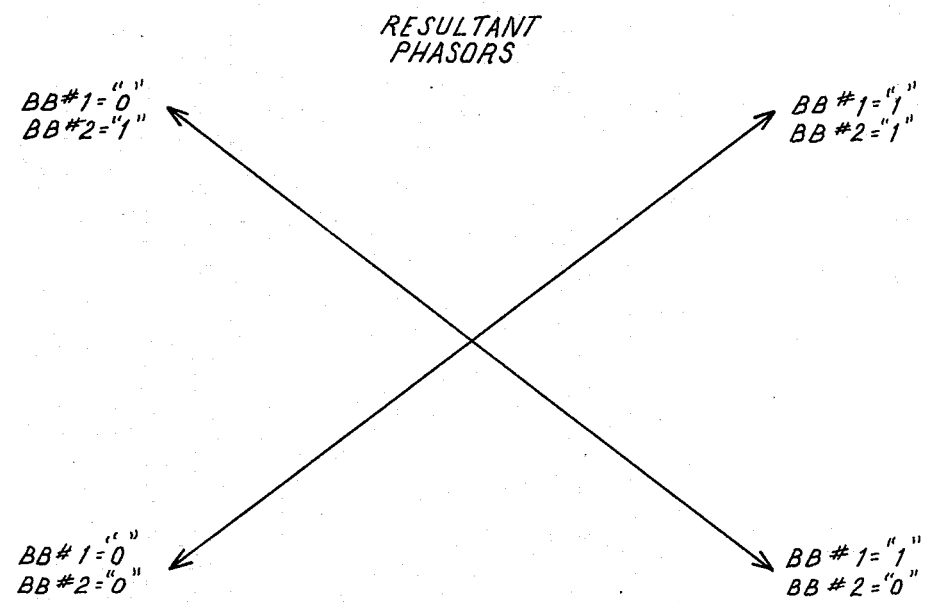

QUADRAPHASE MODULATOR

BACKGROUND OF THE INVENTION

This invention relates to modulators and more particularly to a quadraphase modulator for digital baseband signals.

Quadraphase modulation is a technique in common useage for transmitting two digital signals in the same bandwidth that is normally used for a single signal. Basically, two RF (radio frequency) carriers at the identical frequency, but 90° apart in phase are phase modulated by two separate digital baseband signals. The receiver can then detect either baseband signal by properly setting the phase of the internally generated carrier signal used for demodulation.

SUMMARY OF THE INVENTION

An object of the present invention is to provide an improved quadraphase modulator for digital baseband signals.

A feature of the present invention is the provision of a quadraphase modulator comprising: a first source of RF carrier signal; a second source of a first digital baseband signal; a third source of a second digital baseband signal; first means coupled to the first source to provide first and second RF carrier signals in-phase with each other; second means coupled to the first means and the second source to phase modulate one of the first and second carrier signals by the first baseband signal to provide a first phase modulated signal; third means coupled to the first means and the third source to phase modulate the other of the first and second carrier signals by the second baseband signal to provide a second phase modulated signal; fourth means coupled to the second and third means to provide a difference signal from the first and second modulated signals and to provide a sum signal from the first and second modulated signals; fifth means coupled to the fourth means to phase shift the difference signal a predetermined amount; sixth means coupled to the fourth and fifth means responsive to the sum signal and the phase shifted difference signal to produce a quadraphase output signal; and seventh means coupled to the sixth means to couple the quadraphase output signal to a transmitting antenna.

BRIEF DESCRIPTION OF THE DRAWING

Above-mentioned and other features and objects of this invention will become more apparent by reference to the following description taken in conjunction with the accompanying drawing, in which:

FIG. 1 is a diagram illustrating the component phasors for quadraphase modulation;

FIG. 2 is a diagram illustrating the resultant phasors for quadraphase modulation;

DESCRIPTION OF THE PREFERRED EMBODIMENT

In many cases, in the transmitter, the phase modulation for each of the two RF carrier signals is plus or minus 90° in response to a baseband signal equal to binary "1" or binary "0". For this case, the amplitude of the composite waveform is ideally constant regardless of the states of the two digital baseband signals. For the four possible combination of states (0 or 1 in either digital baseband signal) only the phase angle of the carrier changes. FIG. 1 is the phasor diagram illustrating the phase angles for the component phasors, while FIG. 2 is a phasor diagram illustrating the phase angles of the resultant phasors. It should be noted from FIG. 1 that the amplitudes of the two carrier signal components do not necessarily have to be equal to each other. The generated composite signal is usually fed into a hard limiting amplifier so that the amplitude of the transmitted RF signal remains constant independent of any modulator imperfections or gain changes.

Figure 3:
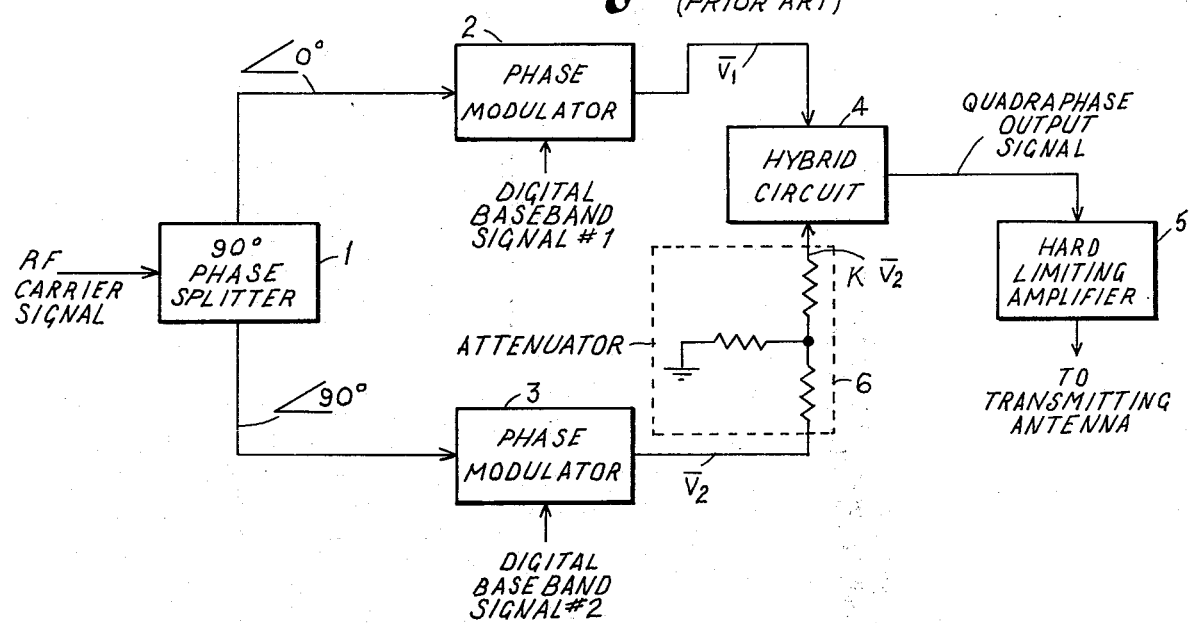
FIG. 3 is a block diagram of a prior art quadraphase modulator.

The technique for quadraphase modulation in general use at present is illustrated in FIG. 3. The RF carrier signal is split into two components in 90° phase splitter 1 with these two components being 90° apart in phase. The 0° RF carrier signal from phase splitter 1 is coupled to a phase modulator 2 and the 90° RF carrier signal is coupled to phase modulator 3 so that each carrier component can be phase modulated (in phase or 180° out-of-phase with the input carrier) in response to its own digital baseband signal. The output signals from modulators 2 and 3 are then combined in a hybrid circuit 4 whose output signal is fed to a hard limiting amplifier 5 prior to coupling to a transmitting antenna. If the voltage ratio (k) between the two RF components as illustrated in FIG. 1 is not equal to unity, then an attenuator 6 must be inserted after the modulator for the smaller signal to give the desired value of K. In the illustration of FIG. 3, the signal $\overline{V_2}$ is considered to be the smaller modulated signal and, therefore, attenuator 6 is coupled between modulator 3 and hybrid circuit 4. In the assumed amplitude condition of the two RF components of FIG. 1, $K = |\overline{V_2}|/|\overline{V_1}|$.

TABLE I presented below shows the voltage amplitude and phase relationships for the four possible baseband signal states. The zero phase reference is taken as the positive X axis in FIG. 1, and positive angles are counter clockwise.

TABLE I

| State of Digital Baseband Signal | | | | Output of Hybrid 4 $= \dfrac{\overline{V_1} + K\overline{V_2}}{2}$ |
|---|---|---|---|---|
| No. 1 | No. 2 | $\overline{V_1}$ | $K\overline{V_2}$ | |
| 0 | 0 | V $\lfloor 180°$ | KV $\lfloor 270°$ | $\sqrt{\dfrac{1+K^2}{2}}$ V $\lfloor 180° + B$ |
| 0 | 1 | V $\lfloor 180°$ | KV $\lfloor 90°$ | $\sqrt{\dfrac{1+K^2}{2}}$ V $\lfloor 180° - B$ |
| 1 | 1 | V $\lfloor 0°$ | KV $\lfloor 90°$ | $\sqrt{\dfrac{1+K^2}{2}}$ V $\lfloor B$ |
| 1 | 0 | V $\lfloor 0°$ | KV $\lfloor 270°$ | $\sqrt{\dfrac{1+K^2}{2}}$ V $\lfloor -B$ |

, where $B = \tan^{-1}(K)$.

In the system of FIG. 3, any amplitude variations of the average modulator output signal or of the attenuator will be directly reflected in the generated value of the ratio K. Also, any deviation of the phase relationship between $\overline{V_1}$ and $\overline{V_2}$ from the nominal value of 90°, caused either by imperfections of phase splitter 1 or by unequal delays in the two branches, will result in amplitude modulation between states 0, 0 or 1, 1 and states 0, 1 or 1, 0. This amplitude modulation will be greatly reduced at the output of the modulator because of amplifier 5. However, hard limiting amplifiers have the undesirable property of converting amplitude modulation at the input to phase modulation at the output. For a given amplifier at the selected operating point, this effect may be characterized by a number M, with units of degrees per db (decibel).

An analysis of the modulator of FIG. 3 shows that the error in the ratio K is given by:

$$e(K) = 0.0231 \, MA$$

where A is the departure of $\overline{V_1}$ and $\overline{V_2}$ from orthogonality (expressed in degrees); M is as defined above (degrees/db); $e(K)$ is the departure of ratio K from the ideal value (in db). As an example, if $A = 3°$ and $M = 10°/db$ than $e(K) = 0.69$ db.

In some applications, it is desirable to control the ratio K very closely. The uncertainty factors described above can then lead to unsatisfactory system performance.

Figure 4:
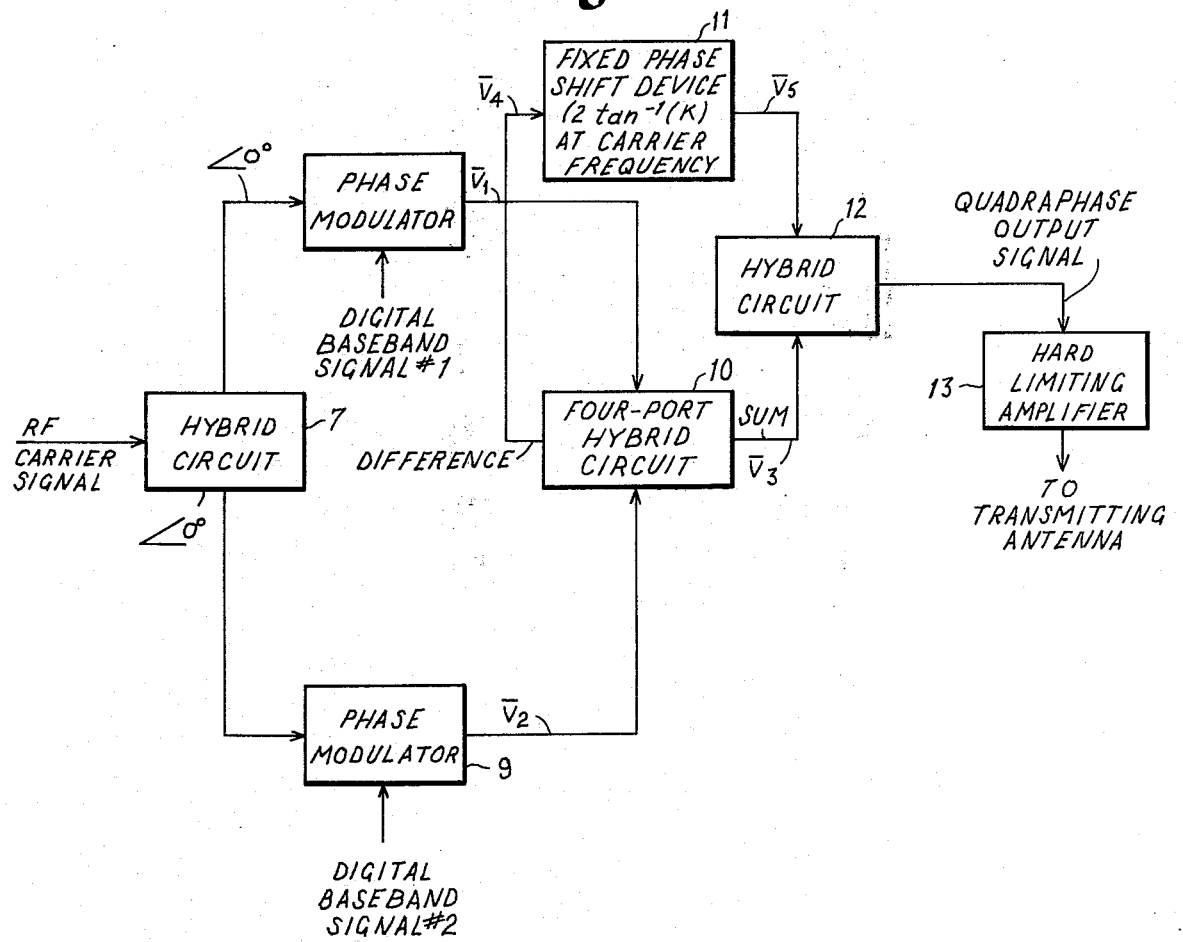
FIG. 4 is a block diagram of a quadraphase modulator in accordance with the principles of the present invention.

Referring to FIG. 4 there is illustrated a block diagram of a quadraphase modulator in accordance with the principles of the present invention which can alleviate some of the problems encountered in the prior art system of FIG. 3. In the modulator of FIG. 4 the RF carrier signal is split into two equal, in-phase components by a standard hybrid circuit 7. One output signal of hybrid circuit 7 is phase modulated by a first digital baseband signal in phase modulator 8 and the second output of hybrid circuit 7 is phase modulated by a second digital baseband signal in phase modulator 9. The modulator output signals $\overline{V_1}$ and $\overline{V_2}$ are fed into a four-port hybrid circuit 10 resulting in a sum signal $\overline{V_3}$ and a difference signal $\overline{V_4}$. The difference signal is phase shifted by a fixed amount by fixed phase shift device 11 to give a phase shift equal to 2B, where $B = \text{Tan}^{-1}(K)$, resulting in an output signal $\overline{V_5}$. $\overline{V_3}$ and $\overline{V_5}$ are then combined in a standard hybrid circuit 12 to give the desired quadraphase output which is processed through hard limiting amplifier 13 prior to being coupled to a transmitting antenna.

TABLE II shows the voltage amplitude and phase relationships for the four possible baseband signal states. The conventions employed in TABLE II are the same as employed in TABLE I.

TABLE II

| State of Digital Baseband Signal | | $\overline{V_1}$ | $\overline{V_2}$ | $\overline{V_3}$ $=\dfrac{\overline{V_1}+\overline{V_2}}{\sqrt{2}}$ | $\overline{V_4}$ $=\dfrac{\overline{V_1}-\overline{V_2}}{\sqrt{2}}$ | $\overline{V_5}$ $=\overline{V_4}\angle -2B$ | Output of Hybrid 12 $=\dfrac{\overline{V_3}+\overline{V_5}}{\sqrt{2}}$ |
|---|---|---|---|---|---|---|---|
| No. 1 | No. 2 | | | | | | |
| 0 | 0 | V∠180° | V∠180° | √2 V∠180° | 0 | 0 | V∠180° |
| 0 | 1 | V∠180° | V∠0° | 0 | √2 V∠180° | √2 V∠180°−2B | V∠180°−2B |
| 1 | 1 | V∠0° | V∠0° | √2 V∠0° | 0 | 0 | V∠0° |
| 1 | 0 | V∠0° | V∠180° | 0 | √2 V∠0° | √2 V∠−2B | V∠−2B |

If the output signals of hybrid circuit 4 and hybrid circuit 12 are compared, it is noted that the phase angles for the modulator of FIG. 4 are simply those of the modulator of FIG. 3 minus the angle B. Since only the relative phase between states is of interest to the user of the received signal, the information contained in the ideal output of FIG. 4 is identical to that for the modulator of FIG. 3.

Analysis of the modulator of FIG. 4 shows the following:

1. Amplitude variations from the four-port hybrid circuit 10 (average value of $\overline{V_1}$ compared to the average value of $\overline{V_2}$) will be directly reflected in the generated value of ratio K. The effect here is the same as for amplitude variations anywhere in the branch circuits of FIG. 3.

2. Amplitude variations after the four-port hybrid 10 ($\overline{V_5}$ compared to $\overline{V_3}$) generate an error:

$$e(K) = 0.076 \, \frac{1+K^2}{K} \, MU \, (db)$$

where M, K, $e(K)$ are as previously defined and U is the amplitude unbalance in db.

3. Phase variations before the four-port hybrid 10 have only a second order effect.

4. Phase variations after the four-port hybrid generate an error:

$$e(K) = 0.038 \, \frac{1+K^2}{K} \, A' \, (db)$$

where A' is the phase variation from the nominal in degrees.

Each application must, of course, be traded off based upon actual system parameters. A comparison of $e(K)$ for the modulators of FIGS. 3 and 4 will be made for some typical values here in order to illustrate the advantage of the circuit of FIG. 4 over the prior art circuit of FIG. 3.

For FIG. 3, assume:
Total amplitude variation = 0.5 db,
Total phase variation = 3°, and
M = 10°/db.
e (K) due to amplitude variation = 0.5 db.
e (K) due to phase variation
= 0.0231 × M × A
= 0.0231 × 10 × 3 = 0.69 db.
The worst case value of e (K) = 0.5 + 0.69 = 1.19 db.
For FIG. 4, assume:
1. Amplitude variation before hybrid circuit 10 = 0.25 db;
2. Amplitude variation after hybrid circuit 10 = 0.25 db;
3. Phase variation before hybrid circuit 10 = 1.5°;
4. Phase variation after hybrid circuit 10 = 1.5°;
   M = 10°/db, and
   K = 0.7.
e (K) due to (1) above = 0.25 db;

$$e\ (K)\ \text{due to (2) above} = 0.076 \times \frac{1.49}{0.7} \times 10 \times 0.25 = 0.41\ db;$$

e (K) due to (3) above = 0; and $$e\ (K)\ \text{due to (4) above} = 0.038 \times \frac{1.49}{0.7} \times 1.5 = 0.12\ db$$

The worst case value of e (K) = 0.25 + 0.41 + 0.12 = 0.78 db.

The above comparison indicates an improvement of 0.41 db for the conditions assumed. Other conditions will, of course, produce more or less improvement.

While I have described above the principles of my invention in connection with specific apparatus it is to be clearly understood that this description is made only by way of example and not as a limitation to the scope of my invention as set forth in the objects thereof and in the accompanying claims.

I claim:
1. A quadraphase modulator comprising:
   a first source of radio frequency carrier signal;
   a second source of a first digital baseband signal;
   a third source of a second digital baseband signal;
   first means coupled to said first source to provide first and second radio frequency carrier signals in phase with each other;
   second means coupled to said first means and said second source to phase modulate one of said first and second carrier signals by said first baseband signal to provide a first phase modulated signal;
   third means coupled to said first means and said third source to phase modulate the other of said first and second carrier signals by said second baseband signal to provide a second phase modulated signal;
   fourth means coupled to said second and third means to provide a difference signal from said first and second modulated signals and to provide a sum signal from said first and second modulated signals;
   fifth means coupled to said fourth means to phase shift said difference signal a predetermined amount;
   sixth means coupled to said fourth and fifth means responsive to said sum signal and said phase shifted difference signal to produce a quadraphase output signal; and
   seventh means coupled to said sixth means to couple said quadraphase output signal to a transmitting antenna.
2. A modulator according to claim 1, wherein said first means includes a first hybrid circuit.
3. A modulator according to claim 2, wherein each of said second and third means includes a phase modulator.
4. A modulator according to claim 3, wherein said fourth means includes a four-port hybrid circuit.
5. A modulator according to claim 4, wherein said fifth means includes a fixed phase shift device.
6. A modulator according to claim 5, wherein said predetermined amount of phase shift for said phase shift device is equal to $2\ \tan^{-1}\ (K)$, where K is the voltage ratio of said first and second modulated signals.
7. A modulator according to claim 6, wherein said sixth means includes a second hybrid circuit.
8. A modulator according to claim 7, wherein said seventh means includes a hard limiting amplifier.
9. A modulator according to claim 1, wherein each of said second and third means includes a phase modulator.
10. A modulator according to claim 9, wherein said fourth means includes a four-port hybrid circuit.
11. A modulator according to claim 10, wherein said fifth means includes a fixed phase shift device.
12. A modulator according to claim 11, wherein said predetermined amount of phase shift for said phase shift device is equal to $2\ \tan^{-1}\ (K)$, where K is the voltage ratio of said first and second modulated signals.
13. A modulator according to claim 12, wherein said sixth means includes a hybrid circuit.
14. A modulator according to claim 13, wherein said seventh means includes a hard limiting amplifier.
15. A modulator according to claim 1, wherein said fourth means includes a four-port hybrid circuit.
16. A modulator according to claim 15, wherein said fifth means includes a fixed phase shift device.
17. A modulator according to claim 16, wherein said predetermined amount of phase shift for said phase shift device is equal to $2\ \tan^{-1}\ (K)$, where K is the voltage ratio of said first and second modulated signals.
18. A modulator according to claim 17, wherein said sixth means includes a hybrid circuit.
19. A modulator according to claim 18, wherein said seventh means includes a hard limiting amplifier.
20. A modulator according to claim 1, wherein said fifth means includes a fixed phase shift device.
21. A modulator according to claim 20, wherein said predetermined amount of phase shift for said phase shift device is equal to $2\ \tan^{-1}\ (K)$, where K is the voltage ratio of said first and second modulated signals.
22. A modulator according to claim 21, wherein said sixth means includes a hybrid circuit.
23. A modulator according to claim 22, wherein said seventh means includes a hard limiting amplifier.
24. A modulator according to claim 1, wherein said predetermined amount of phase shift for said fifth means is equal to $2\ \tan^{-1}\ (K)$, where K is the voltage ratio of said first and second modulated signals.
25. A modulator according to claim 24, wherein said sixth means includes a hybrid circuit.

26. A modulator according to claim 25, wherein said seventh means includes a hard limiting amplifier.

27. A modulator according to claim 1, wherein said sixth means includes a hybrid circuit.

28. A modulator according to claim 27, wherein said seventh means includes a hard limiting amplifier.

29. A modulator according to claim 1, wherein said seventh means includes a hard limiting amplifier.

* * * * *